H. N. FAAS & H. E. DODSON.
CULTIVATOR.
APPLICATION FILED MAR. 7, 1908.

961,762.

Patented June 21, 1910.
9 SHEETS—SHEET 1.

Fig. 1

Witnesses
G. Howard Walmsley.
Edward F. Reed.

Inventors
Henry N. Faas,
Harry E. Dodson,
By
Attorney

UNITED STATES PATENT OFFICE.

HENRY N. FAAS AND HARRY E. DODSON, OF SPRINGFIELD, OHIO, ASSIGNORS, BY MESNE ASSIGNMENTS, TO THE AMERICAN SEEDING MACHINE COMPANY, OF SPRINGFIELD, OHIO, A CORPORATION OF OHIO.

CULTIVATOR.

961,762.   Specification of Letters Patent.   Patented June 21, 1910.

Application filed March 7, 1908. Serial No. 419,617.

*To all whom it may concern:*

Be it known that we, HENRY N. FAAS and HARRY E. DODSON, citizens of the United States, residing at Springfield, in the county of Clark and State of Ohio, have invented certain new and useful Improvements in Cultivators, of which the following is a specification, reference being had therein to the accompanying drawings.

This invention relates to cultivators, and more particularly to that type known as wheel cultivators.

The object of the invention is to produce a cultivator of this type, in which the cultivating members can be so supported that they may be maintained at all times in the desired relation to the line of travel of the cultivator; to provide suitable mechanism for so maintaining the cultivating members; and further, to produce such a cultivator having the ground wheels and cultivating member both pivotally connected thereto and having means for simultaneously moving said ground wheels and said cultivating members about their pivotal centers, whereby the cultivator is steered to maintain the cultivating members at the proper distance from the row of plants being cultivated and the cultivators are moved about their pivotal centers to maintain the same in the proper relation to the line of travel of the cultivator, thus presenting them to the soil at the desired angle and causing them to turn an equal amount of soil at all times.

With these objects in view our invention consists in certain novel features of construction and in certain parts and combinations hereinafter to be described, and then more particularly pointed out in the claims.

In the accompanying drawings.

Figure 1:
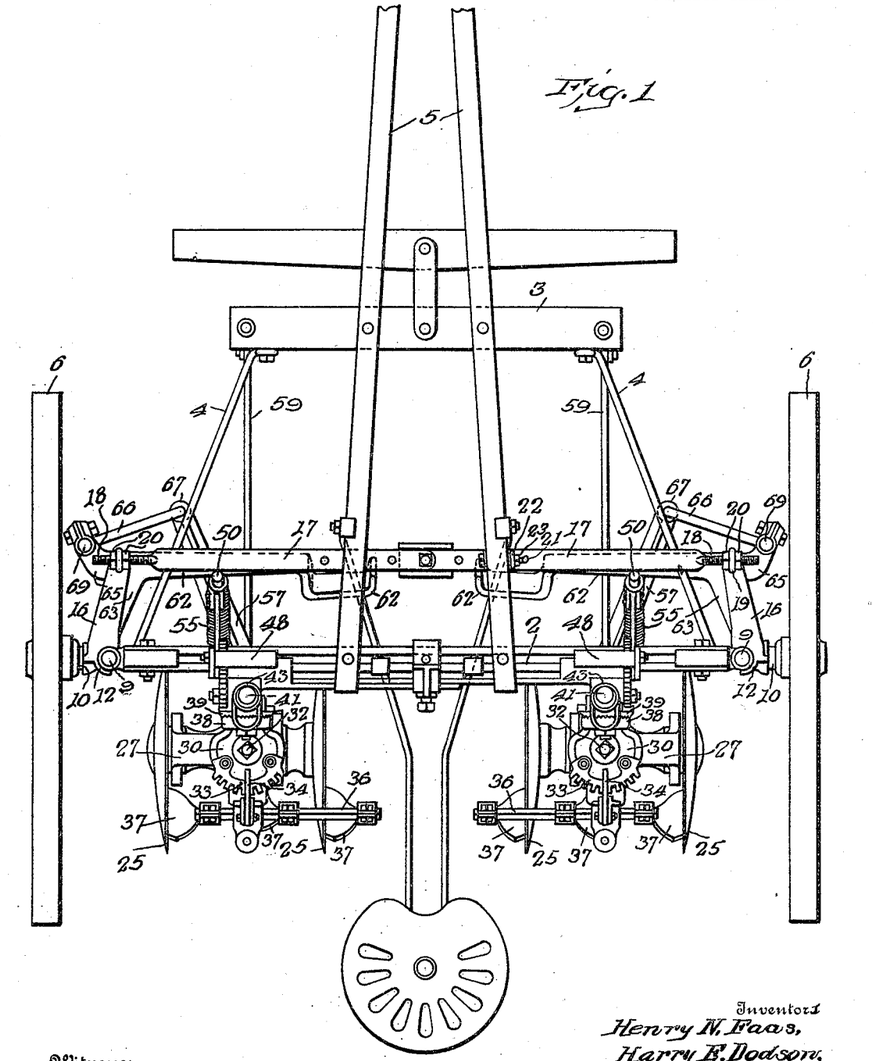
Figure 1 is a top plan view of a cultivator embodying our invention.
Figure 2:
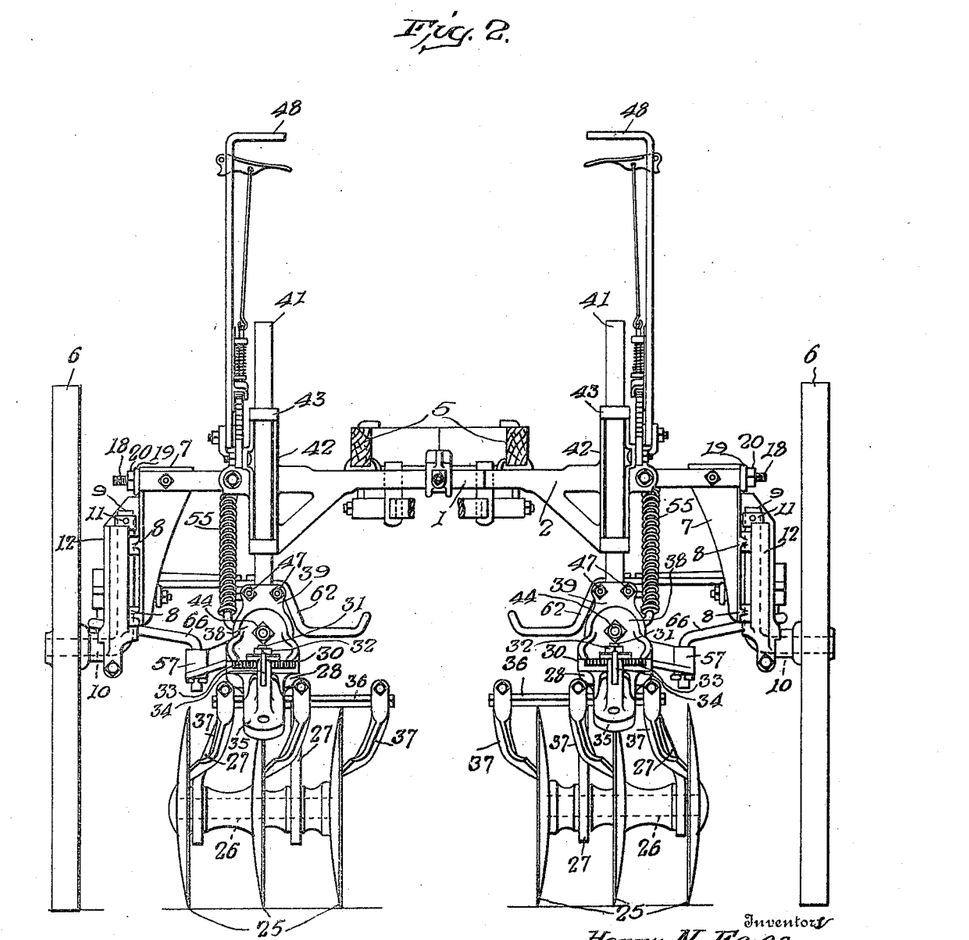
Fig. 2 is a rear elevation of the same.
Figures 3, 15:
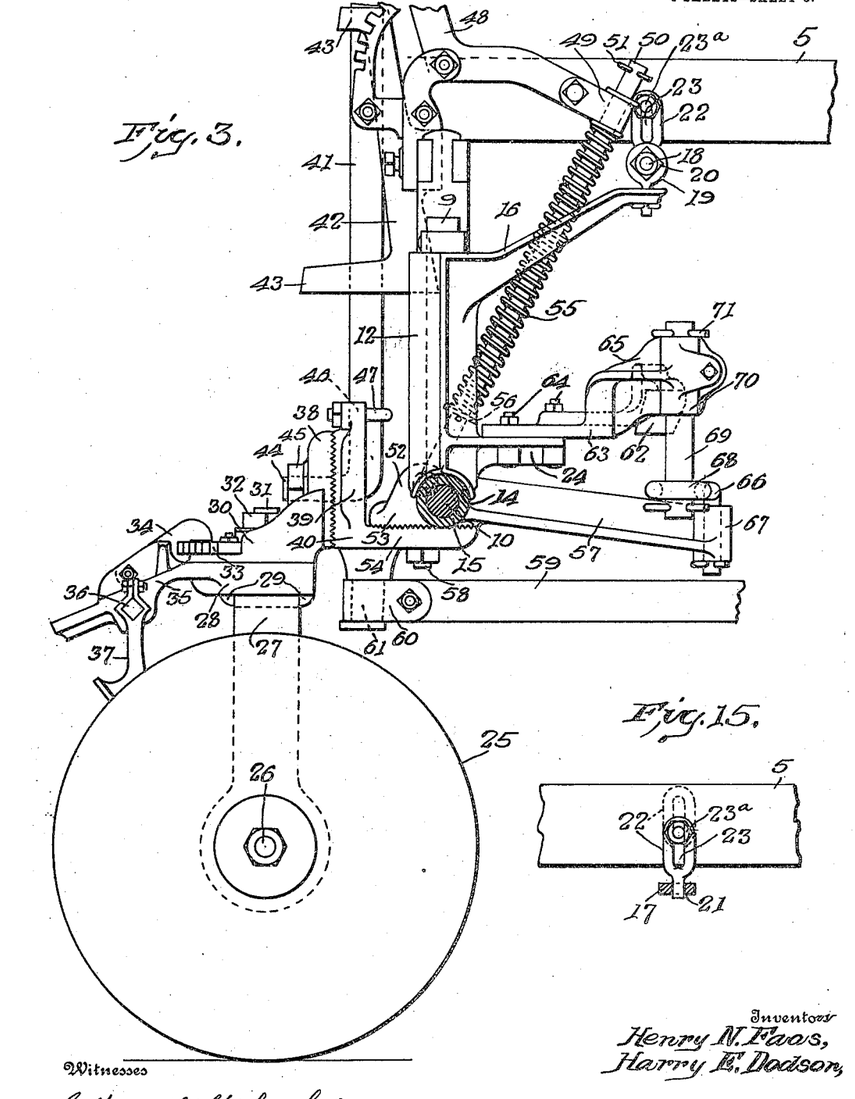
Fig. 3 is a side elevation of the rear portion of such a cultivator, with the ground wheel removed.
Fig. 15 is a detail view of the movable stop.

In Figs. 1, 2 and 3 of these drawings, we have illustrated the preferred form of our invention and have shown the same as embodied in a cultivator of a well known type. This cultivator comprises a main frame 1 which consists of rear and front transverse members 2 and 3, which transverse members are connected by means of longitudinally extending bars 4 forming a four-sided frame. The rear and front members 2 and 3 are further connected one to the other by means of the pole or draft tongue which is rigidly secured to both of said members and extends in front of said frame. In the present instance, this tongue comprises two forwardly converging members 5, both of which are rigidly secured to the front and rear transverse members and form a part of the main frame of the cultivator. The rear transverse member 2 also comprises a part of the axle frame by means of which the ground wheels 6 are connected to the main frame. These ground wheels are, in the present instance, pivotally connected to the main frame and are preferably secured to downwardly extending brackets 7 which are rigidly secured to the transverse member 2 near the opposite ends thereof and each of which is provided with suitable bearing lugs 8 on the outer face thereof adapted to receive the upwardly extending standard or pivot lug 9 of the axle 10, upon which the ground wheel 6 is mounted. This upwardly extending standard 9 is preferably formed by bending upward the inner end of the axle 10 so that the upwardly extending portion will be arranged at substantially right angles to the axle 10. The pivotal movement of the vertical portion 9 of the axle may be controlled in any suitable manner, but preferably by providing the axle with an arm to which may be attached suitable operating mechanism. This arm may be secured to the axle in any desired manner, but we prefer to construct the same in the form of a bracket 12, preferably having its inner face recessed to extend over a portion of the upwardly extending standard 9 and bearing lugs 8, and provided with an apertured lug or collar 11 adapted to be rigidly secured to the standard 9 above the bearing lugs 8, to maintain the bracket 12 in a fixed relation to the axle 10, and also serving to retain the vertical portion 9 of the axle 10 within the bearing lugs 8. The lower portion of the bracket 12 is also recessed, as shown at 14, to extend over the axle 10 and the sleeve or hub 15 which is mounted thereon, thus further assisting in retaining the bracket against any pivotal movement about the standard 9 and maintaining the same in a fixed relation to the pivoted axle 10. This bracket 12 is provided, preferably near its upper end, with an arm 16, which, in the present instance, extends toward the front of the machine and is adapted to be connected to the corresponding arm of the opposite axle in such a manner as to rigidly connect these axles and cause the same to move in unison about their respective pivotal centers. The connecting means here shown comprises a bar 17 having each of its ends screw-threaded, as shown at 18, and adapted to extend through an eye-bolt 19, which is secured near the outer end of the arm 16, and adjustably held therein by means of nuts 20 arranged on the opposite sides of the eye of said bolt. This bar may also, if desired, be provided with suitable means for holding the same against movement, thus locking the axles in the desired position and holding the same against all pivotal movement. In the form here shown this locking means consists in providing the bar 17 with a series of apertures 21 adapted to receive a locking pin carried by a portion of the main frame. This pin preferably consists of a plate 22 having its lower portion reduced to form a pin which is adapted to enter the aperture 21 and having its upper portion provided with a longitudinal slot 23 adapted to engage a bolt 23ᵃ carried by a portion of the main frame, by means of which the plate is adjustably mounted upon the main frame and may be moved into or out of engagement with said aperture in the bar 17 and may be locked in its adjusted position. The bracket 12 is also provided with a second arm or projection 24 extending forwardly therefrom and adapted to connect said bracket with suitable operating mechanism, as will be hereinafter described.

The cultivating members, of which there are preferably two, may be of any suitable character and are supported on opposite sides of the center of the main frame in any suitable manner, preferably by means of a suitable support which is so mounted on the main frame as to have both a vertically reciprocatory and a rotatory movement relatively thereto. In the present instance, these cultivating members are shown as each comprising a plurality of disks 25 mounted upon a suitable shaft 26 which is connected to the main frame in any suitable manner, preferably by means of a substantially U-shaped yoke 27 which is adapted to engage the shaft 26 at points near its opposite ends and is secured to a bearing plate 28 forming part of the support and provided with downwardly extending lugs 29 adapted to engage the opposite sides of the upper portion of the yoke 27 and hold the same against movement relatively thereto. The bearing plate 28 is pivotally connected to a second and coöperating plate 30 by means of a bolt 31 extending through the upper portion of the yoke 27 and the bearing plates 28 and 30 and provided with a nut 32 for securing said members in their assembled positions. Suitable means are provided for controlling the pivotal movement of the bearing plate 28 relatively to the bearing plate 30 and the support. This means preferably consists of a toothed segment 33 mounted on the plate 30 and a dog or pawl 34 carried by the plate 28 and adapted to engage the teeth of said segment to prevent the pivotal movement of the plate 28. The dog 34 is preferably mounted on a rearwardly extending arm 35 which also supports the transverse bar 36, upon which are mounted a series of scrapers 37 adapted to engage the surface of the disks 25 and free the same from any accumulations of soil or trash which may adhere thereto. The bearing plate 30 is provided with an upwardly extending member or plate 38 having its outer face serrated and adapted to coöperate with the serrated face of a similar plate 39 forming part of a bracket 40, which, in connection with the bearing plates 30 and 28, forms the support for the cultivating members. This support is connected to the main frame by means of a vertical standard 41 which extends upwardly therefrom and through a suitable vertical bearing connected to the main frame, and, in the present instance, comprising a bracket 42 having a plurality of bearing lugs 43, within which the standard 41 has both a reciprocatory and a rotatory movement. The standard may be connected to the support in any suitable manner, but is preferably connected, as shown in Fig. 3, where the lower portion of the standard is shown as turned at right angles thereto to form a bolt 44 which extends through the coöperating plates 38 and 39 and is provided with a suitable nut 45 to lock these plates in their adjusted positions relatively one to the other. The plate 39 is preferably provided with a groove or recess 46 to receive the lower portion of the standard 41 and prevent the bracket 40, of which the plate 39 forms a part, from rotating about the horizontal portion of the standard. A suitable clip 47 extends about the standard 41 and through the upper portion of the plate 39 and serves to secure the standard within the recess 46 of said plate. The plate 39 being thus held against movement about the horizontal portion of the standard, it will be seen that by loosening the nut 45 the plate 38 may be turned about its horizontal axis and arranged in any desired position to adjust the disks 25 at the desired angle to the main frame and locked in this position by tightening down the nut 45 and bringing the serrated faces of the plates 38 and 39 into engagement one with the other. The vertical movement of the standard 41 and the support for the cultivating members is controlled by means of a suitable hand lever 48 mounted on the main frame and having its outer end provided with a sleeve or bearing 49, in which is slidably mounted a rod 50 having at its end a suitable stop 51. This rod is connected at its lower end to the support for the cultivating members. In the present instance, this rod is connected to an apertured lug 52 extending upwardly from the plate 53 which is supported by the horizontal member 54 of the bracket 40. A suitable spring 55 is coiled about the rod 50 between the sleeve 49 and the lower end of the rod which is provided with a suitable stop 56. The plate 53 also has a forwardly extending arm 57 and is preferably adjustably mounted upon the plate 54 so that the arm 57 can be arranged at the desired angle to the plate 54 and to the support, of which said plate forms a part. This adjustability is preferably secured by forming the adjacent surfaces of the plates 53 and 54 with serrations or teeth and securing the same one to the other by a suitable bolt 58. A suitable drag bar 59 extends from the forward transverse member 3 of the main frame to the support for the cultivating members, and, in the present instance, this drag bar is connected to the transverse member 3 by means of a horizontal pivot, permitting the drag bar to move through a vertical plane. The opposite end of the drag bar is provided with a vertical bearing sleeve or apertured lug 60 which engages a vertical stud 61 extending downwardly from the bracket 40 which forms a part of said support.

Suitable mechanism is provided for operating the arm 57 to move the support for the cultivating members about its vertical axis and for connecting this arm to the arm 24 of the pivoted axle 10, whereby the cultivating members and the ground wheel are moved simultaneously and to a like extent. This operating mechanism preferably comprises a foot lever 62 having one end provided with two arms, one of which, 63, is rigidly secured to the projection or arm 24 of the bracket 12 by means of suitable bolts 64, while the other arm 65 is connected to the arm 57 of the support for the cultivating members by means of a suitable link. This link, in the present instance, comprises a rod or bar 66 having one end bent at substantially right angles thereto and adapted to engage a bearing aperture 67 formed in the outer end of the arm 57 and having its opposite end bent upon itself to form an eye 68 adapted to receive the lower end of a pin 69 carried by the arm 65. This arm is preferably provided near its outer end with a vertical bearing 70, within which the pin 69 is mounted and is held by means of a suitable stop 71. Thus, it will be seen that the foot lever 62, which is rigidly connected to the pivoted axle 9, pivots about the same center as does said axle and any movement of that lever is transmitted to the ground wheel, and that by this movement of the ground wheel the cultivator is steered to maintain the cultivating members in the desired relation to the row of plants which is being cultivated, and, this lever being also connected to the support for the cultivating members, the movement of the foot lever serves to move said support about its vertical axis 41 and thus maintain the cultivating members or disks in the desired relation to the line of travel of the cultivator, thereby causing the same to engage the soil at the same angle at all times; and further, that the pivoted axles of each ground wheel being rigidly connected one to the other, any movement of one of these axles is transmitted to the other so that the forward movement of the foot lever on one side will turn the ground wheels and cultivating members in one direction, while the forward movement of the other foot lever will turn said ground wheels and cultivating members in the opposite direction.

Figure 4:
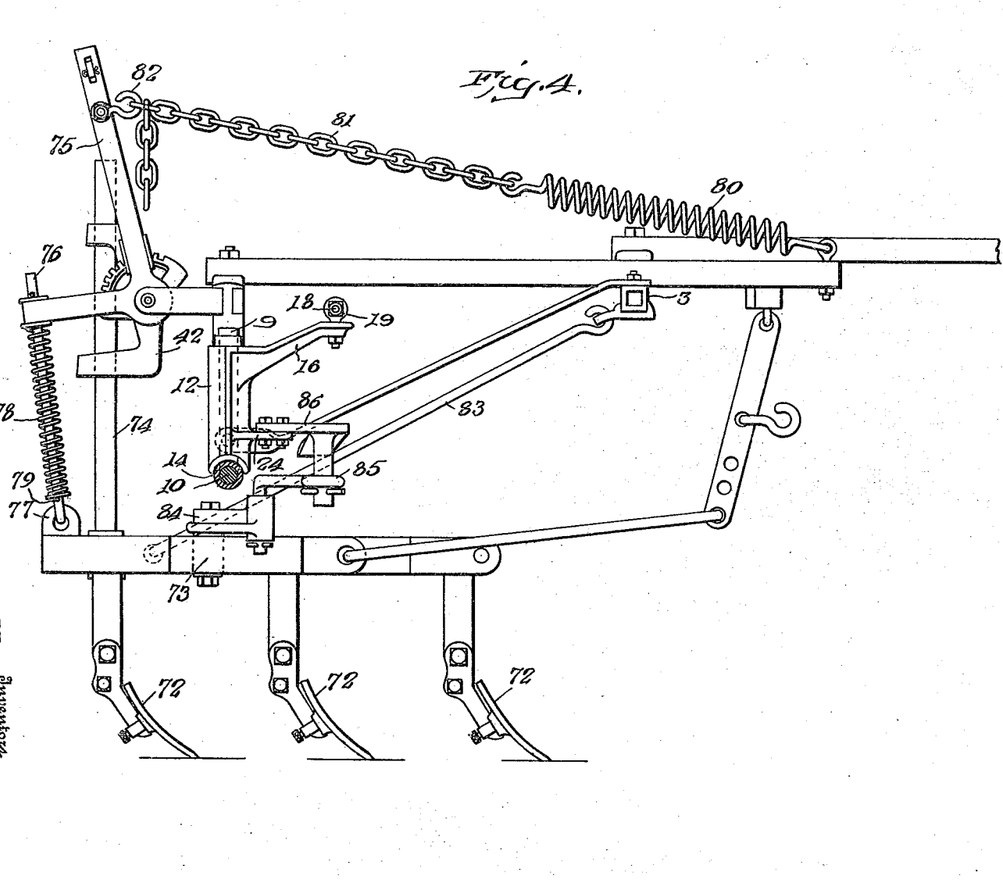
Fig. 4 is a side elevation of a shovel cultivator, with the ground wheel removed and showing our invention applied thereto.
Figure 11:
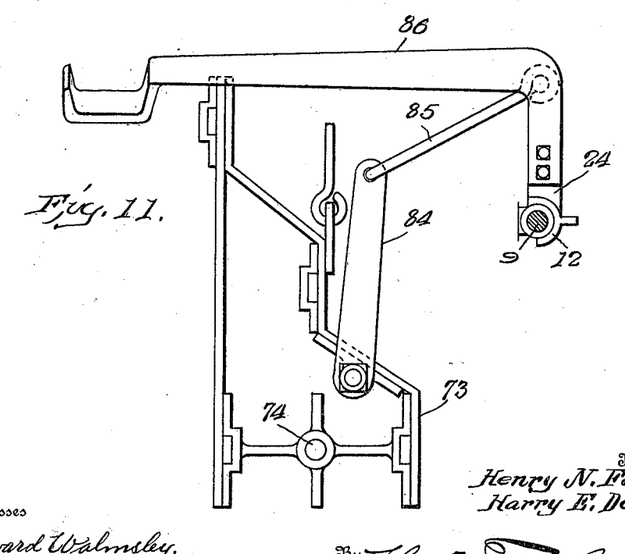
Fig. 11 is a detail plan view of the operating mechanism of the form shown in Fig. 4.
Figure 12:
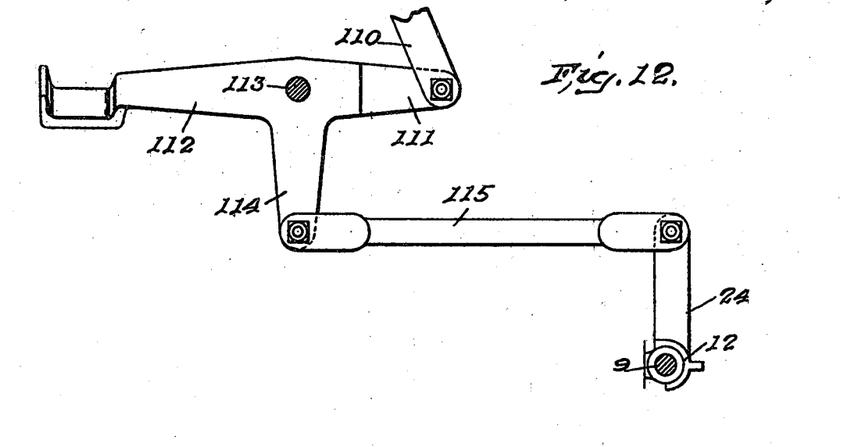
Fig. 12 is a detail plan view of a portion of the operating mechanism shown in Fig. 6.

In Figs. 4 and 11, we have shown a form of the device, similar to that shown in Figs. 1, 2 and 3, applied to a shovel cultivator. In this cultivator the pivoted axle for the ground wheel is the same as that above described and the cultivating members, which in this form are the shovels 72, are carried by a support or gang beam 73 which is pivotally connected to the main frame by means of a vertical standard 74, which is rigidly secured at its lower end to said gang beam near the rear end thereof and is slidably and rotatably mounted in the bearing bracket 42 which is carried by the main frame. An operating lever 75 is pivotally mounted on the main frame and a rod 76 is slidably connected at one end to one arm of said lever and pivotally connected at its opposite end to an apertured lug 77 carried by said gang beam. A spring 78 is coiled about the rod 76 between the arm of the lever 75 and a suitable stop 79 near the lower end of said lever, thus forming a resilient connection between the lever and the gang beam. The other arm of the lever is connected by means of a spring 80 with the forward end of the main frame, the spring 80 being connected to the lever 75 by an adjustable connection, such as a chain 81 adapted to engage a hook 82 carried by the lever. The drag bar 83 is pivotally connected at its forward end to the forward transverse member 3 of the main frame and is pivotally connected at its other end to the gang beam 73 at a point near the standard 74. By connecting the drag bar close to the pivotal center of the gang beam it offers little or no resistance to the movement of the gang beam about its pivotal center. An arm 84 is rigidly secured to the gang beam 73 and has its outer end connected by means of a link 85 with a foot lever 86, one end of which is connected to the arm or projection 24 of the pivoted axle. The foot lever is preferably substantially L-shaped and the link 85 is connected thereto at or near the angle thereof. Thus, as the foot lever is actuated to move the pivoted axle about its vertical axis, the arm 84 is also actuated and the gang beam moved about its pivotal center and the cultivating members maintained in the same relation to the line of travel of the cultivator.

Figure 5:
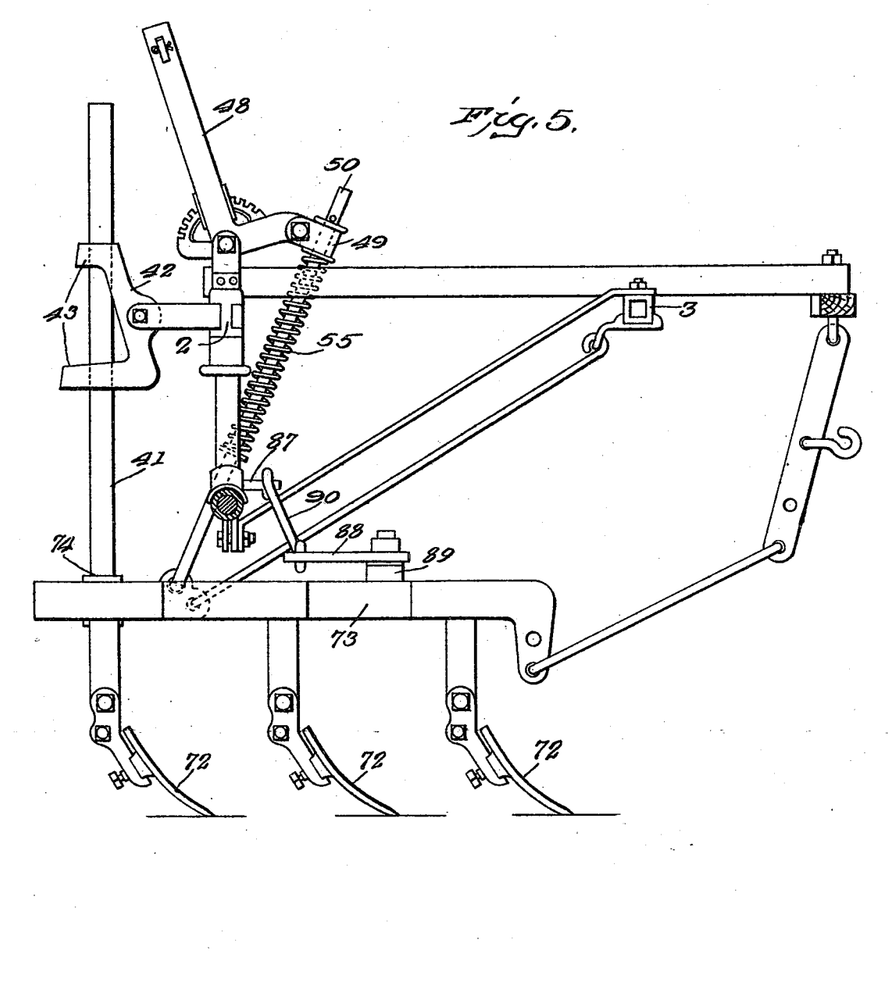
Fig. 5 is a similar view of a shovel cultivator having a stationary axle.
Figures 6, 7, 8:
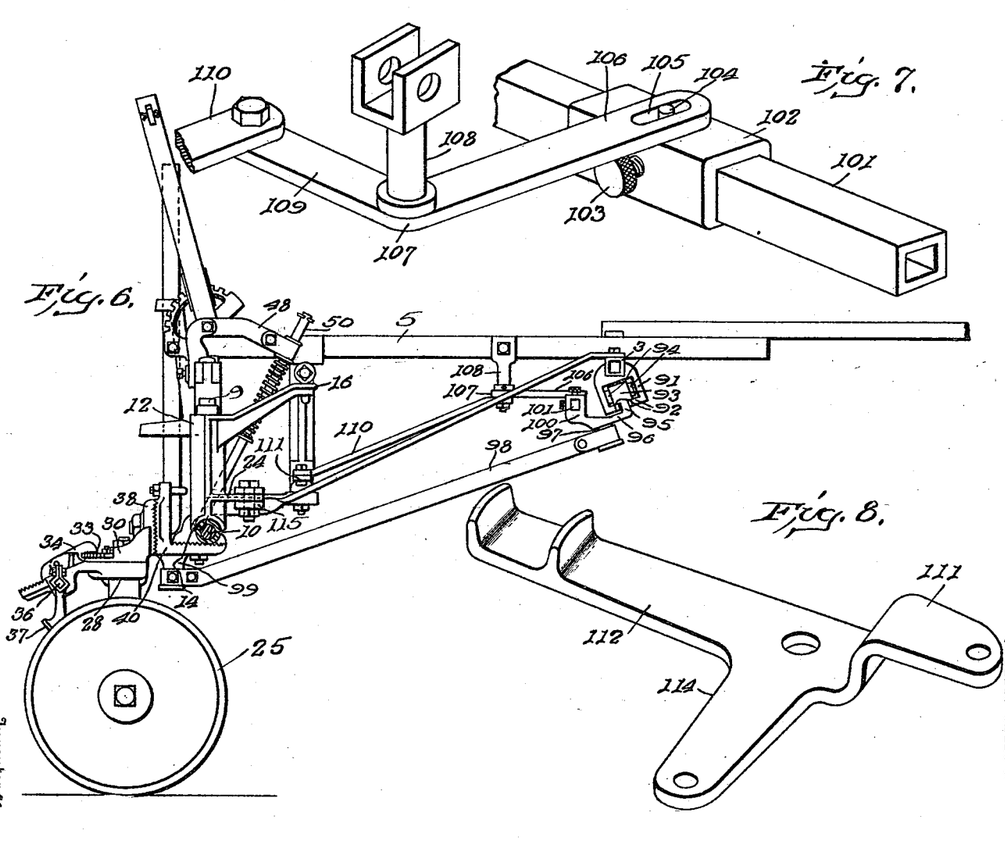
Fig. 6 is a side elevation of a disk cultivator having the ground wheel removed and showing a modified form of operating mechanism.
Fig. 7 is an enlarged view of a portion of the operating mechanism of Fig. 6.
Fig. 8 is an enlarged detail view of the foot lever of Fig. 6.
Figure 10:
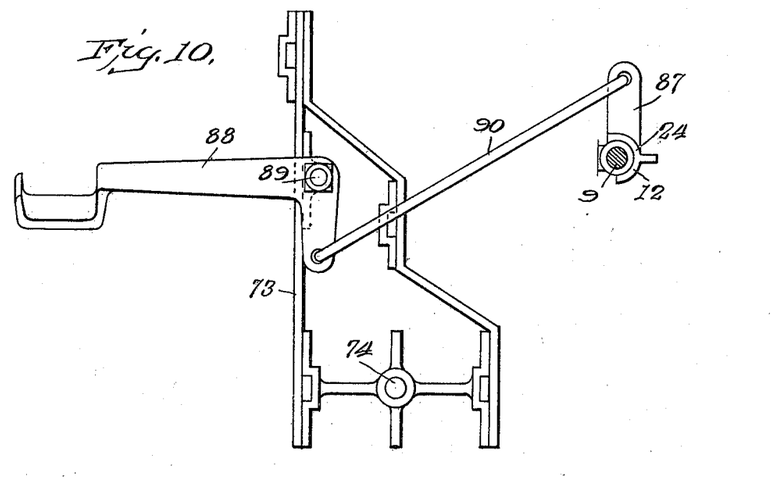
Fig. 10 is a detail plan view of a portion of the operating mechanism employed in the form of cultivator shown in Fig. 5.

In the form of the device shown in Figs. 5 and 10, a fixed axle is employed and the cultivating members, which, in this instance, are the shovels 72 carried by the gang beam 73, alone are movable. These are mounted and connected to the main frame in substantially the same manner as are the cultivating members of Figs. 4 and 11, but, in this instance, the axle is provided with a stationary arm 87, and the foot lever 88, which is substantially L-shaped, is pivotally connected at a point near the angle thereof with the gang beam or support 73, as shown at 89. This foot lever is connected at a point near its extremity with the fixed arm 87 by means of a suitable link 90. Thus, when the foot lever is actuated the gang beam or support 73 is moved about its vertical axis and the cultivating members are adjusted to maintain the same in the desired relation to the travel of the cultivator.

In Figs. 6, 7, 8 and 12, we have shown a form of the invention, in which the construction and arrangement of ground wheels and cultivating members is similar to that of Figs. 1, 2 and 3, but in which the operating mechanism is of a different character from that employed in the machine shown in those figures. This operating mechanism consists in so connecting the drag bar to the support for the cultivating members and to the forward portion of the main frame that the forward end thereof is capable of movement transversely of the main frame and such movement is adapted to move the support of the cultivating members about its pivotal center, and in providing means for moving the forward end of the drag bar simultaneously with the movement of the ground wheel about its vertical axis. In the preferred form of the device the forward transverse member 3 of the main frame has secured thereto and extending longitudinally thereof a guideway preferably comprising a channel bar 91 having its lower edges turned inwardly to form flanges 92. A suitable guide block 93 is slidably mounted within said guideway and is preferably provided with suitable antifriction rollers 94. This block has a stem 95 extending outwardly between the flanges 92 and provided with an arm 96 having a downwardly extending pivot stud 97, to which is pivotally connected the forward end of the drag bar 98, the opposite end of which is rigidly connected to a lug 99 carried by the bracket 40. The arm 96 has an upwardly extending apertured portion 100 in which is adjustably secured a bar or rod 101. This bar is of such a length that it extends to the opposite end of the transverse member 3 and is there connected to the other guide block 93. A suitable sleeve or collar 102 is adjustably mounted upon the bar 101 by means of a suitable set screw 103 and has extending upwardly therefrom a pin or projection 104 adapted to engage a slot 105 formed in one arm 106 of a bell crank lever 107 which is mounted on a downwardly extending pivot stud 108 which is supported from the main frame. The other arm 109 of the bell crank lever 107 is pivotally connected to a link or connecting rod 110, the opposite end of which is connected to one arm 111 of a foot lever 112 which is pivotally mounted on the pivot stud 113 supported from the main frame. A second arm 114, which is rigidly secured to said foot lever 112, is connected by means of a link 115 with the projection or arm 24 of the pivoted axle. Thus, it will be seen that when the foot lever is actuated the ground wheel will be turned about its pivotal axis and the bell crank lever 107 actuated to shift the bar 101 transversely of the main frame, which bar being rigidly secured to the arm 96 of the guide block 93 to which the forward end of the drag bar 98 is connected, carries the forward end of the drag bar with it, and, as the opposite end of this drag bar is so connected to the support for the cultivating members that it has no lateral movement relatively thereto, this support is necessarily turned about its pivotal center, thus adjusting the cultivating members relatively to the line of travel of the machine. The movement of the block 93 in the channel bar 91 is comparatively short and the loose fit of the block within the bar is sufficient to permit the block to accommodate itself to the varying distances between the support and the channel bar.

Figure 9:
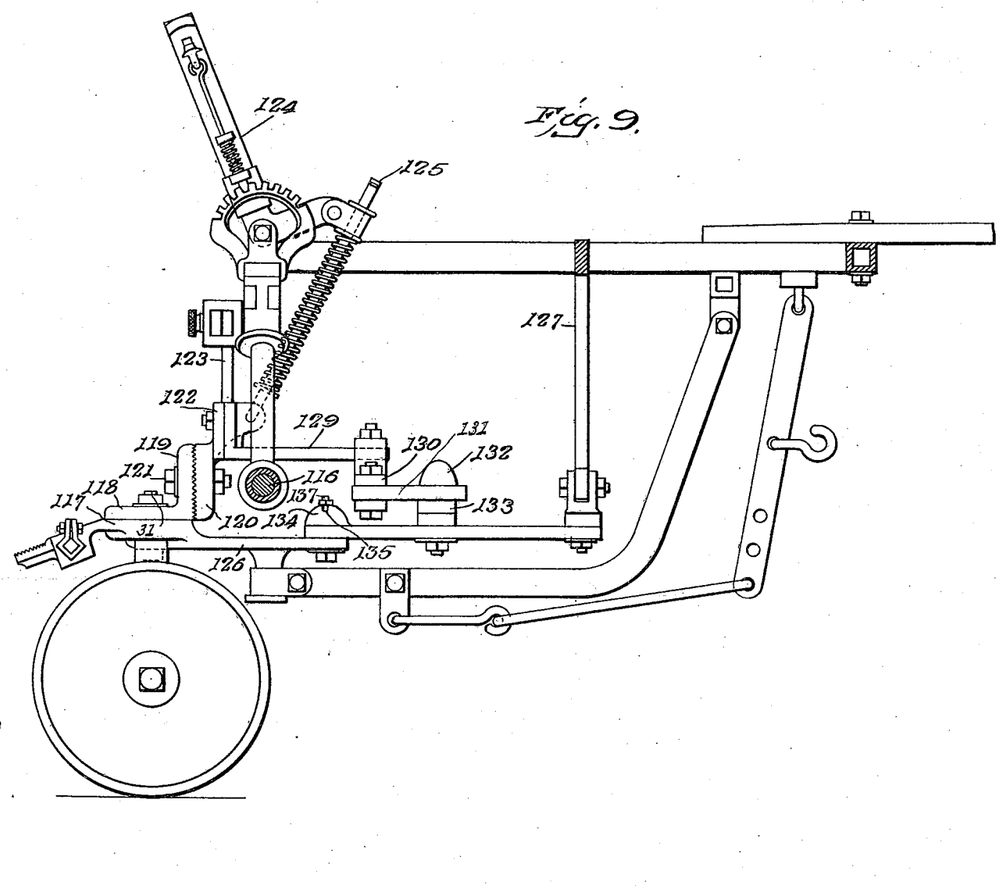
Fig. 9 is a side elevation of a disk cultivator having the ground wheel removed and showing a further modification of the operating mechanism.
Figures 13, 14:
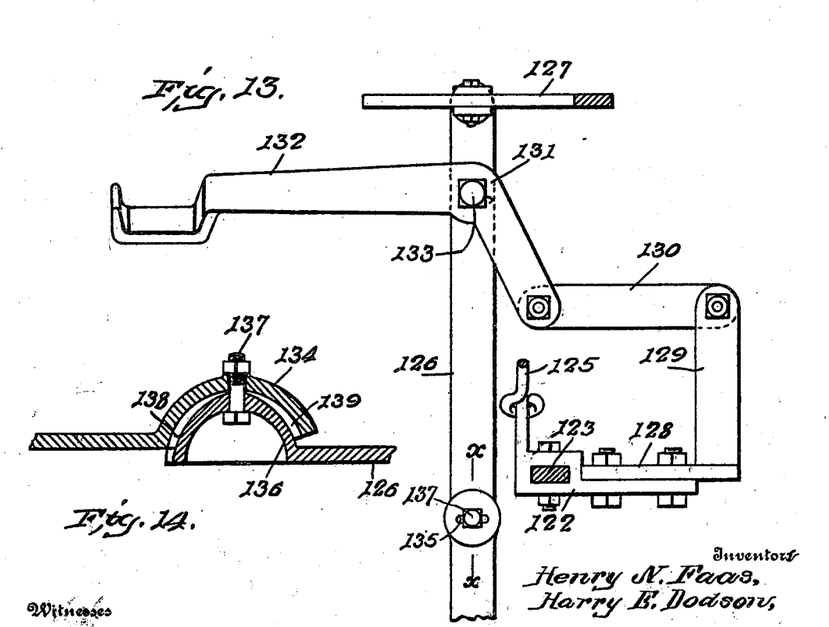
Fig. 13 is a detail plan view of the operating mechanism shown in Fig. 9.
Fig. 14 is a sectional view on the line $x$ $x$ of Fig. 13.

In Figs. 9, 13 and 14, a still further modification of the invention is shown. In this form the ground wheels are mounted upon fixed axles 116 which are rigidly supported from the main frame. The cultivating members or disks are supported from the bearing plate 117 in the same manner as are the disks of Figs. 1, 2 and 3. This bearing plate is pivotally connected with a coöperating plate 118 which is vertically adjustable on the main frame and is also capable of movement about a horizontal axis to adjust the disks at an angle to the main frame. The bearing plate 118 is preferably provided with an upwardly extending member 119 having one face serrated and adapted to coöperate with the serrated face of a second plate or member 120, to which it is connected by means of a suitable bolt 121. The plate 120 has rigidly secured thereto and preferably formed integral therewith an upwardly extending apertured member 122 adapted to receive one arm of a yoke 123, which is rigidly secured thereto, extends transversely of the machine and has its other arm connected to the other cultivating member. The vertical movement of the yoke 123 and the cultivating members which are connected thereto is controlled by a lever 124 connected to the member 122 by means of a suitable rod 125 and an actuating lever mounted on the main frame, as in the other forms of the device. The plate 117 has a forwardly extending portion or arm 126 which is pivotally connected at its outer end to a yoke 127 which extends transversely of the main frame and is connected at its other end to the corresponding arm 126 on the opposite side of the cultivator, thereby causing said arms and, consequently, the cultivating members, to move in unison. The member 122 also has an outwardly extending projection or arm 128 which, in turn, has an arm or projection 129 extending forwardly at right angles thereto. The forward end of the arm 129 is connected, by means of a link 130, with one arm 131 of the foot lever 132, which foot lever is pivotally mounted at a point intermediate its ends on the arm 126, as shown at 133. Thus it will be seen that the foot lever is connected at one end to a part of the machine which is held against lateral movement relatively to the support for the cultivating members and is connected at a point intermediate its ends with the arm 126. Consequently, any movement of the foot lever 132 would cause the forward end of said arm 126 to move transversely of the main frame around the pivot 31 and thus would cause the plate 117 and the cultivating members carried thereby to rotate about a vertical axis, thereby adjusting the cultivating members relatively to the line of travel of the cultivator. The arm 126 is preferably constructed in two pieces and connected by means of a universal joint, which will permit the adjustment of the arm to maintain the forward portion of the same at all times in the desired position relatively to the operating mechanism, but which will permit the rear portion, to which the cultivating members are connected, to be adjusted either vertically or horizontally relatively to that forward portion, as the cultivating members may be adjusted relatively to the main frame. The joint by means of which the two parts of the arm 126 are connected is preferably of the ball and socket type, one part of the arm being provided with a socket 134 having a transverse slot 135 formed therein. The other portion of the arm is provided with a projection or semispherical part 136 adapted to fit within the socket 134 and to be connected thereto by means of a bolt 137 extending through the projection 136 and the slot 135 in the part 134, thus enabling the two parts of the arm 126 to be adjusted about a longitudinal axis and thus permitting the cultivating members to be adjusted about a horizontal axis relatively to the main frame. The socket 134 is preferably provided with ribs 138 adapted to coöperate with a projection or rib 139 carried by the part 136. Thus, by loosening the bolt 137, the two parts can be adjusted at an angle one to the other, the parts being locked in their adjusted position by tightening down the bolt 137.

The operation of the device will be readily understood from the foregoing description and it will be obvious that we have provided a cultivator in which the cultivating members may be readily adjusted to maintain the same in the desired relation to the line of travel of the cultivator; that we have provided adequate means for so adjusting the said cultivating members; and further, that we have provided such a cultivator in which both the ground wheels and the cultivating members are pivotally supported and which is provided with suitable mechanism for simultaneously operating said ground wheels and said cultivating members, thus steering the machine to bring the cultivating members in the desired relation to the row and adjusting the cultivating members to present the same to the soil at the proper angle relatively to the line of travel of the cultivator.

It will be obvious that the invention is capable of many modifications and of being applied to many forms of cultivators, and, while we have herein shown several forms of the invention, we wish it to be understood that we do not desire to be limited to the exact details of construction shown and described, for obvious modifications will occur to a person skilled in the art.

Having thus fully described our invention, what we claim as new and desire to secure by Letters Patent, is:—

1. In a cultivator, the combination, with a main frame, an axle mounted on said main frame, a ground wheel carried by said axle, a cultivating member, and a support for said cultivating member pivotally connected to said main frame near the rear end thereof and movable about a vertical axis, of means for connecting said axle to said support comprising a foot lever mounted on one of said members, and a link connecting said lever to the other of said members.

2. In a cultivator, the combination, with a main frame, an axle mounted on said main frame, a ground wheel carried by said axle, a cultivating member, and a support for said cultivating member pivotally connected to said main frame near the rear end thereof and movable about a vertical axis, of means for connecting said axle to said support, comprising a forwardly extending arm rigidly secured to one of said members, a lever mounted on the other of said members, and a link connected at one end to said arm and at the other end to said lever at a point removed from the point of connection of said lever to its supporting member.

3. In a cultivator, the combination, with a main frame, an axle mounted on said main frame, a ground wheel carried by said axle, a cultivating member, and a support for said cultivating member pivotally connected to said main frame and movable about a vertical axis, of a forwardly extending arm rigidly secured to said support, a second forwardly extending arm supported by said main frame, a lever mounted on one of said arms, and a link connecting said lever to the other of said arms.

4. In a cultivator, the combination, with a main frame, an axle pivotally mounted thereon, a ground wheel carried by said axle, a cultivating member, and a support for said cultivating member pivotally connected to said main frame near the rear end thereof and movable about a vertical axis, of an arm rigidly secured to said axle, a second arm rigidly secured to said support, and arranged substantially parallel with the first-mentioned arm, a foot lever, and means for operatively connecting said foot lever to both of said arms.

5. In a cultivator, the combination with a main frame, an axle pivotally mounted thereon, a ground wheel carried by said axle, a cultivating member, and a support for said cultivating member pivotally connected to said main frame near the rear end thereof and movable about a vertical axis, of an arm rigidly secured to said axle, a second arm rigidly secured to said support and arranged substantially parallel with the first-mentioned arm, a foot lever rigidly secured to the arm carried by said axle, and a link connecting said lever to the arm carried by said support.

6. In a cultivator, the combination, with a main frame, an axle pivotally mounted thereon, a ground wheel carried by said axle, a cultivating member, and a support for said cultivating member pivotally connected to said main frame near the rear end thereof and movable about a vertical axis, of a forwardly extending arm rigidly secured to said support, a lever rigidly connected to said axle, and means for operatively connecting said lever to said arm.

7. In a cultivator, the combination, with a main frame, an axle pivotally mounted thereon, a ground wheel carried by said axle, a cultivating member, and a support for said cultivating member pivotally connected to said main frame near the rear end thereof and movable about a vertical axis, of an arm rigidly secured to said support, a foot lever having one end bifurcated, one arm of said lever being rigidly connected to said axle, and means for connecting the other arm carried by said lever to the arm carried by said support.

8. In a cultivator, the combination, with a main frame, an axle pivotally mounted thereon, a ground wheel carried by said axle, a cultivating member, and a support for said cultivating member pivotally connected to said main frame and movable about a vertical axis, of a forwardly extending arm rigidly secured to said support, a bracket secured to said axle, a lever rigidly secured to said bracket, and a link connecting said lever to the arm carried by said support.

9. A cultivator comprising a frame, ground wheels therefor, a pivoted axle for each of said ground wheels, cultivating members, a support for said members pivotally connected to said frame near the rear end thereof, an arm rigidly secured to said support, a foot lever having a bifurcated end, one of the arms of said bifurcation being rigidly secured to said pivoted axle, and a link connecting the other arm of said bifurcation to the arm of said support.

10. A cultivating member comprising a frame, ground wheels, pivoted axles for connecting said ground wheels to said frame, arms secured to said pivoted axles, bars secured to the opposite ends of said arms and having a series of holes arranged longitudinally thereof, a plate having a slot at one end thereof, and a pin at the opposite end thereof, a bolt adapted to extend through said slot to loosely connect said plate to the main frame, said pin being adapted to enter one of the holes in said bar to lock said bar against movement, cultivating members pivotally supported from said frame, and means for simultaneously moving said cultivating members and said ground wheels about their pivotal centers.

11. A cultivator comprising a frame, cultivating members supported therefrom, a bracket rigidly secured to said frame and having bearing lugs secured thereto, an axle having a vertical portion mounted in said bearing lugs, a bracket having a bearing lug adapted to engage said vertical portion of said axle, a part of said bracket being adapted to engage the horizontal portion of said axle to retain said bracket against movement relatively thereto, an arm carried by said bracket, and means for actuating said arm to cause said axle to move about its pivotal center.

In testimony whereof, we affix our signatures in presence of two witnesses.

HENRY N. FAAS.
HARRY E. DODSON.

Witnesses:
HARRIET L. HAMMAKER,
EDWARD S REED.